United States Patent
Moore

(10) Patent No.: US 6,369,329 B1
(45) Date of Patent: Apr. 9, 2002

(54) CONDUIT-PROTECTIVE SEALING DEVICE

(76) Inventor: Kerry A. Moore, 35147 Hollow Creek Dr., Yucaipa, CA (US) 92399

(*) Notice: Subject to any disclaimer, the term of this patent is extended or adjusted under 35 U.S.C. 154(b) by 0 days.

(21) Appl. No.: 09/556,508

(22) Filed: Apr. 24, 2000

(51) Int. Cl.[7] ............................................. H02G 15/02
(52) U.S. Cl. ...................................................... 174/74 A
(58) Field of Search ............................... 174/74 A, 112, 174/135, 77 R; 224/101; 338/64

(56) References Cited

U.S. PATENT DOCUMENTS

| | | |
|---|---|---|
| 2,942,625 A | 6/1960 | Costanzo |
| 3,587,654 A | 6/1971 | Yocum |
| 3,713,463 A | 1/1973 | Bywater, Jr. |
| 3,962,554 A | 6/1976 | Eigel |
| 4,158,407 A | 6/1979 | Rest |
| 4,168,726 A | 9/1979 | Klennert |
| 5,280,809 A | 1/1994 | Tive |
| 6,135,636 A | * 10/2000 | Randall .................... 383/64 |

* cited by examiner

*Primary Examiner*—Chau N. Nguyen
(74) *Attorney, Agent, or Firm*—Sheldon & Mak

(57) ABSTRACT

A protective device for an electrical or fluid conduit termination includes a flexible polymer sheet member forming a body having a fluid-tight cavity therein and having a closed extremity and a neck forming a singular opening of the cavity for receiving the conduit termination, a first portion of the sheet member being transparent for visual identification of the termination, a second portion of the sheet member having an opaque outer covering forming a marking surface for receiving written indicia thereon, and a third portion being an identification region having coloring for indicating intended use of the device; a tie strap including a band and a buckle for securing the band about the neck for sealingly closing the cavity with at least a portion of the conduit termination sealingly enclosed within the cavity. A sleeve member fixedly located on the body proximate the opening receives a portion of the band for supporting the tie strap assembled with the body, the tie strap having an enlargement for resisting unwanted separation of the tie strap from the body, the body in a flattened condition having a rounded corner contour at the closed extremity for avoiding unwanted trapping of liquid subsequent to use. An elastic band can be substituted for the tie strap.

23 Claims, 3 Drawing Sheets

CONDUIT-PROTECTIVE SEALING DEVICE

BACKGROUND

The present invention relates to electrical and especially hydraulic conduit termination protectors for excluding contamination when such conductors are disconnected from devices with which they operate.

Traditional protective devices for unconnected conduit terminations include caps that are made of a resilient material and formed for mating with particular structure of such terminations. In some cases, such caps are threaded for threaded engagement with a threaded member of the termination; in other cases, the caps are formed to have an interference fit within or about a portion of the termination. It will be understood that the terminations of electrical conduit are commonly called "cable connectors" and/or "cable ends", whereas the terminations of hydraulic conduit (or lines) are commonly called "disconnect fittings". These devices exhibit a number of disadvantages, including one or more of the following:

1. They are ineffective in that portions of the termination (and of the conduit adjacent to the termination) are not covered or otherwise protected from damage or contamination;
2. They have limited application in that they must be configured to have threaded engagement or have an interference fit with particular termination surfaces;
3. They are difficult to install, particularly under adverse conditions such as in poor lighting;
4. They are ineffective in that they can easily be contaminated during storage or use (by hydraulic fluid and/or dirt, for example), a termination having the device subsequently applied being subjected to contamination thereby (particularly when a different fluid is to be carried in the subsequent use);
5. The user would be required to maintain a large inventory of variously sized threaded fittings and/or caps;
6. There would be substantially more guesswork involved trying to size the correct fitting or cap to the desired conduit termination; and
7. Tooling would be needed for installation and/or removal of press fit and threaded caps, the tooling being likely to cause damage to the threads, sealing face, and/or O ring on hydraulic conduit ends, as well as damage to fragile components of electric plug ends.

Thus there is a need for a conduit termination protector that overcomes the disadvantages of the prior art.

SUMMARY

The present invention meets this need by providing a conduit termination protector and method that is particularly effective with a wide variety variously sized electrical and hydraulic terminations. In one aspect of the invention, a protector device for a conduit termination that is attached at an extremity of a conduit, includes a flexible sheet member forming a body having a fluid-tight cavity therein, the body having a neck portion forming a singular opening of the cavity for receiving the conduit termination; and a band member supported relative to the body and having means formed therein for securing the band member about the neck portion in the form of a closed loop for sealingly closing the neck portion onto the conduit when the termination is inserted into the cavity, whereby at least a portion of the conduit termination is sealingly enclosed within the cavity.

Preferably at least a first portion of the sheet member is transparent for visual identification of the conduit termination and any other matter. Preferably the device also has an opaque marking surfacing coating on a second portion only of the sheet member for receiving written indicia of device usage, which can advantageously include identification of the conduit on which the device is used. A third portion only of the outer surface of the sheet member can be a colored identification region for indicating intended use of the device, the second and third portions together being outside of the first portion.

The band member can be provided by a tie strap having a buckle for adjustably holding and securing a portion of the band member. Preferably the device has a sleeve member on the body for receiving a portion of the band member to be assembled with the body prior to use. Preferably the tie strap has a first enlargement, the sleeve member being adapted for hindering passage of the first enlargement therethrough for resisting unwanted separation of the tie strap from the body. The buckle can form the first enlargement, the band member also being formed with a second enlargement, the tie strap being retained by the sleeve member being located between the enlargements. Preferably the sleeve member extends proximate a portion of the opening for avoiding loose outward projection of neck portions adjacent to the opening that would otherwise tend to collect contaminants.

The band member can be elastically stretchable, the means for securing including the band member being formed as a closed loop and having a relaxed condition, a stretched condition for permitting insertion of the conduit termination into the cavity, and an intermediate condition for securing the neck portion on the conduit. The means for securing can further include a sleeve member extending proximate a portion of the opening, the band member extending through the sleeve member and being retained thereby. The body can be adapted for assuming a flattened condition when the conduit termination is not within the cavity, the body in the flattened condition having a body width, the neck portion having a neck width being not more than 30 percent of the body width in the relaxed condition of the band member.

The body in its flattened condition can have a length from the opening to the closed extremity and a width between opposite side edges thereof, preferably having a rounded contour between the closed extremity and the side edges for avoiding unwanted trapping of liquids following use. The rounded contour preferably has a radius being not less than 25 percent of the width of the body in its flattened condition. The width of the body in its flattened condition is typically between 1 inch and 6 inches, the sheet member being formed of a polymer having a preferred thickness of between 0.001 inch and 0.008 inch. The polymer can be polyethylene. Preferably, when there is a likelihood of exposure to harmful materials such as petroleum products, the thickness of the polymer is at least 0.003 inch.

In another aspect of the invention, a method for protecting a conduit termination that is attached at an extremity of a conduit, includes:
(a) providing a device including a flexible bag having a singular opening, and a band member supported adjacent the opening;
(b) inserting at least a portion of the conduit termination through the opening beyond the band member; and
(c) securing the band member about the bag member for sealingly holding the termination portion within the cavity.

The method can further include marking an identification of the conduit termination on the device.

DRAWINGS

These and other features, aspects, and advantages of the present invention will become better understood with reference to the following description, appended claims, and accompanying drawings, where:

DESCRIPTION

Figure 1:
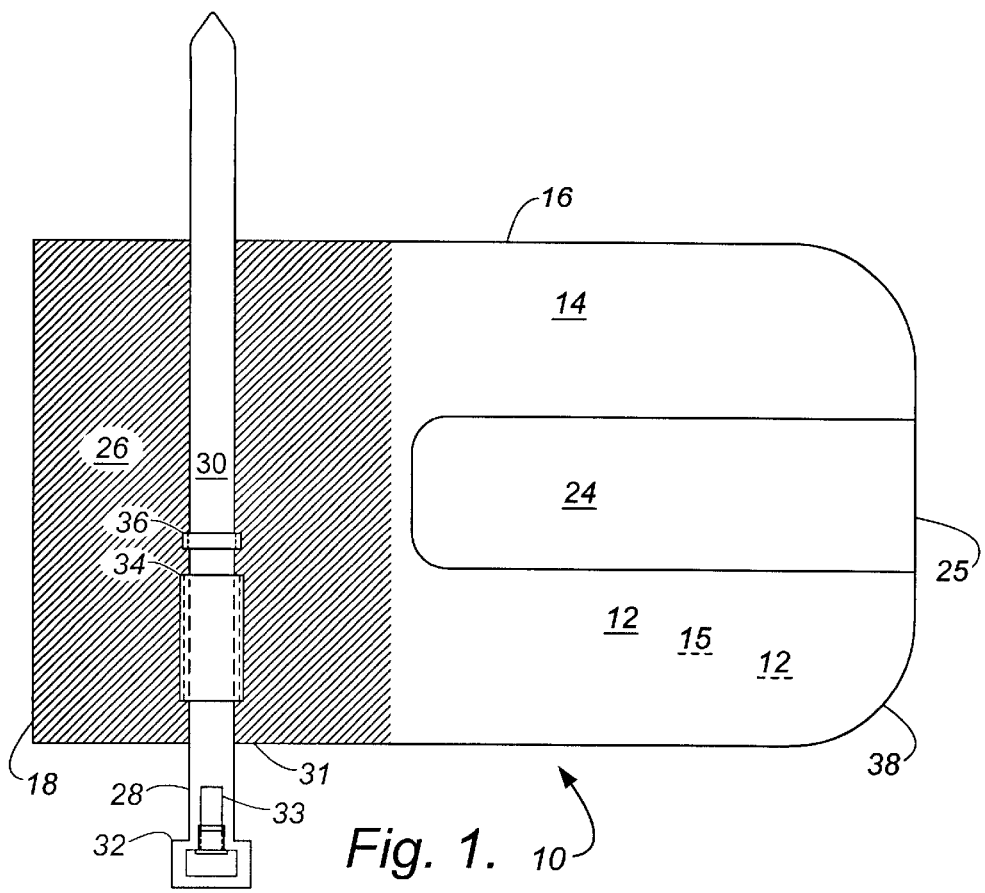
FIG. 1 is a plan view of a conduit termination protector according to the present invention.
Figure 2:
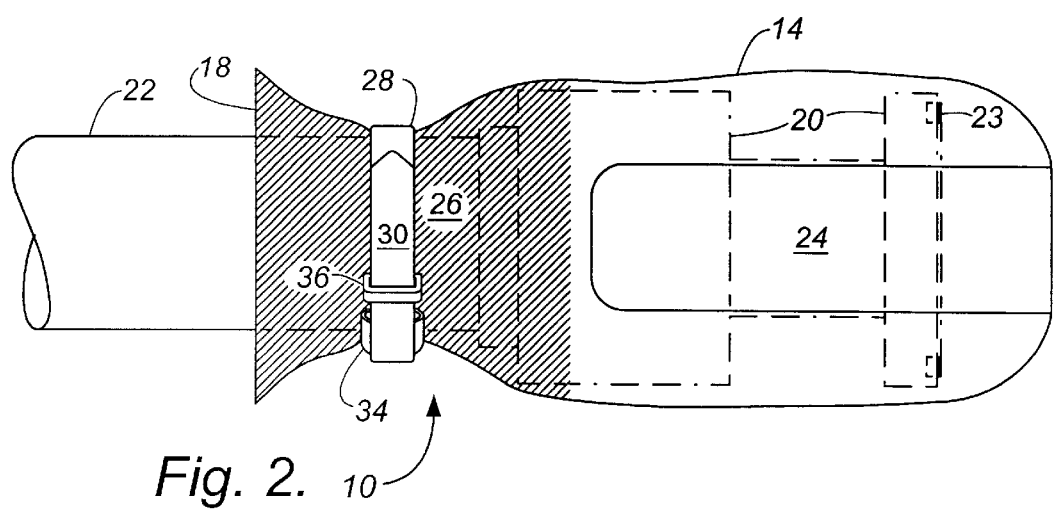
FIG. 2 is a plan view showing the protector of FIG. 1 installed covering a conduit termination.

The present invention is directed to a conduit termination protector that is particularly effective for use in adverse field conditions. With reference to FIGS. 1 and 2 of the drawings, a protector device 10 includes a flexible transparent sheet member 12 that forms a body 14 having a fluid cavity 15. In FIG. 1, the body 14 is shown in a flattened condition, there being separable layers of the sheet member 12 on opposite sides of the cavity 15 and having a seam 16 along a portion of an outer perimeter of the flattened body 14. The body 14 has a singular opening 18 in communication with the cavity 15 for receiving a conduit termination 20 that forms an end extremity of a conduit 22 as shown in FIG. 2. The conduit 22 can be an electrical conduit (the termination 20 being an electrical connector), or a fluid conduit such as a hydraulic or pneumatic line (the termination 20 being a hydraulic pneumatic fitting), or a coolant line. In the case of the conduit 22 being a hydraulic line, the termination 20 may have a sealing ring 23 as shown in FIG. 2.

The body 14 is preferably provided with a marking surface 24 that is located proximate a closed extremity 25 opposite the opening 18, for logging information concerning a connection to be made with the termination 20. Also, an identification region 26 adjacent the opening 18 is preferably brightly colored for facilitating visual identification in low light conditions and for indicating a category of use associated with the conduit 22. The identification region 26 can be a solid color such as red, flourescent orange, flourescent yellow, and reflective colors. Further, the identification region 26 can be marked with a pattern of striping as desired.

Associated with the body 14 is a tie strap 28 having an elongate band portion 30, a buckle 32 being formed at one extremity thereof. The buckle 32 has a conventional ratchet mechanism for engaging serrations that are formed along the band portion 30 when the band portion 30 is threaded through the buckle 32. Devices suitable for use as the tie strap 28 are commercially available, being typically formed of molded Nylon. The tie strap 28 can also be made from string, tape, releasable string, wire, plastic band, rope, velcro, or adhesive strips. Depending on the application, the tie strap 28 can be provided with a release mechanism for permitting reuse of the protector device 10 without having to replace the strap 28. In FIG. 1, the tie strap 28 is shown to include a release lever 33, although the particular form of the release mechanism is not within the scope of the present invention. However in many applications such as when the protector device 10 might be used on conduits 10 that may carry incompatible fluids and/or contamination, it is preferred that the tie strap 28 not have a release mechanism, for preventing (or discouraging) reuse of the device 10.

Preferably the tie strap 28 is attached to the body 14 for facilitating application of the device 10. Accordingly, the band portion 30 extends through a sleeve member 34 that is formed on a neck portion 31 of the body 14, the sleeve member 34 extending parallel to the opening 18. The free end of the band portion 30 having been threaded through the buckle 32 can also be passed through a loop enlargement 36 that is formed at an intermediate location on the band portion 30 as shown in FIG. 2. Additionally, the tie strap 28 is assembled with the sleeve member 34 intermediate the buckle 32 and the loop enlargement 36. More particularly, the band portion 30 slides freely through the sleeve member 34, the loop enlargement 36 being passed through the sleeve member 34 with frictional resistance whereby, once assembled as shown in FIG. 1, the tie strap 28 is retained by the sleeve member 34 being located between the buckle 32 and the loop enlargement 36.

As shown in the drawings, corner extremities of the body 14 opposite the opening 18 are rounded as indicated at 38 for preventing trapping of hydraulic fluid or other liquid that may be present in the conduit 22.

Figure 3:
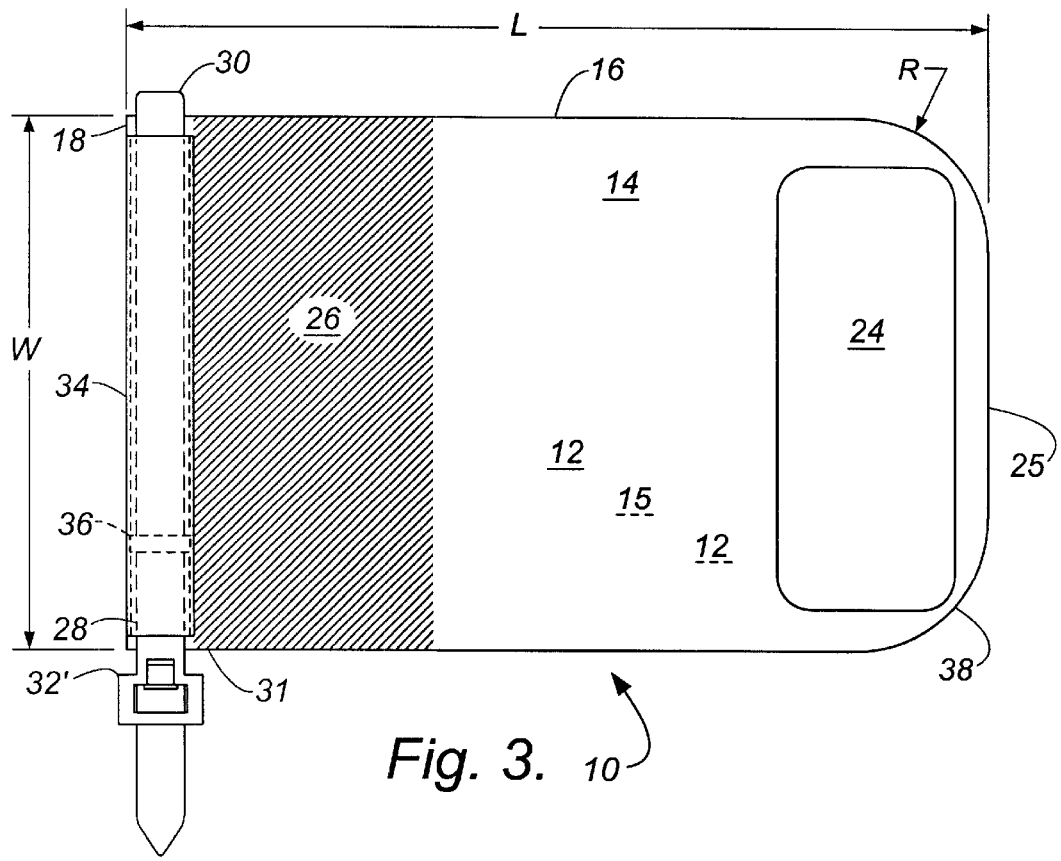
FIG. 3 is a plan view showing an alternative configuration of the protector of FIG. 1.
Figure 4:
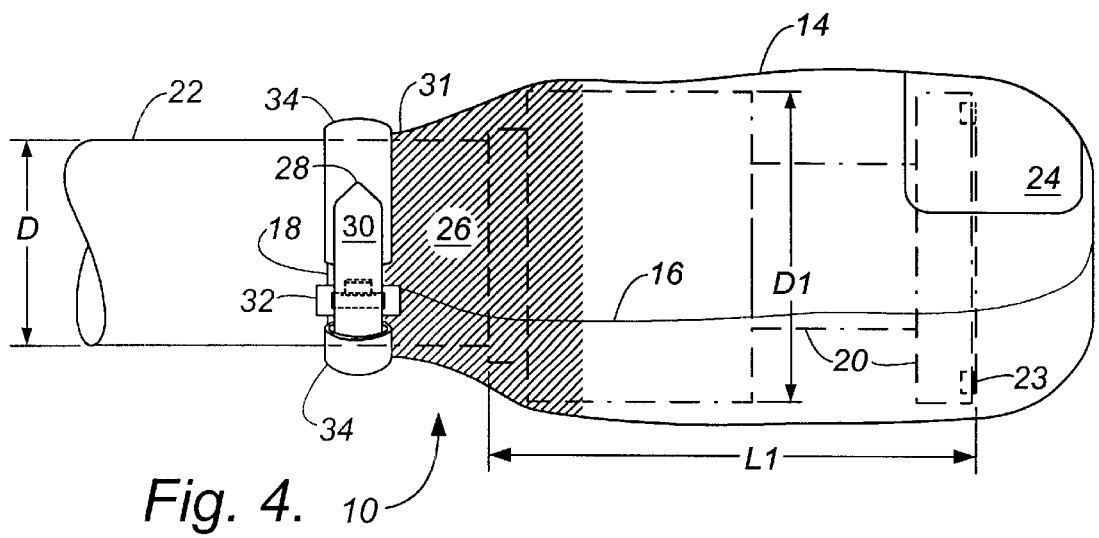
FIG. 4 is a plan view as in FIG. 2, showing the protector of FIG. 3 covering the conduit termination.

With further reference to FIGS. 3 and 4, an alternative and preferred configuration of the device, designated 10', has counterparts of the sleeve member 34 positioned adjacent the opening 18 for avoiding the formation of a loose fitting tail when the tie strap 28 is tightened. Also, the configuration of FIGS. 3 and 4 has the marking surface 24 oriented transversely proximate the closed extremity 25. The sleeve members 34 extend along the opening 18 over a majority of a width W of the neck portion 31, forming an interrupted casing for the band portion 30, the width W being measured in the flattened condition of the body 14. In this configuration, a counterpart of the loop enlargement, designated enlargement 36' is positioned within one of the sleeve members 34 for frictionally retaining the tie strap 28 assembled with the device 10. The sleeve members 34 are spaced sufficiently to allow the buckle 32 to be located therebetween when the tie strap 28 is tightened. It will be understood that while only one such gap is required (as between opposite ends of a singular sleeve member), it is preferred to have a second gap for facilitating fabrication of the sleeve members 34 on respective side portions of the sheet member 12, and for facilitating threading of the band portion 30 through the sleeve members 34 in two relatively straight passes.

The width W is made sufficiently great such that the opening 18 can be expanded to clear an outside diameter D1 of the conduit termination 20, the sheet member 12 and the sleeve members 34 being sufficiently flexible that the neck portion 31 can be evenly tightened about an outside diameter D of the conduit 22. Similarly, the body 14 in the configuration of FIGS. 3 and 4 has a length L that is sufficiently greater than an overall length L1 of the conduit termination 20 to allow the tie strap 28 to be spaced away from the termination 20 on the conduit 22. For example, when the termination diameter D1 can be as large as 2.0 inches, the width W should be not less than approximately 3.25 inches and preferably approximately 3.5 inches. Also, the flexibility of the sheet member 12 and the sleeves 34 in this example should allow tightening the neck portion 31 snugly about the conduit 22 when the conduit diameter D1 is not larger than 1.5 inches, and preferably not larger than 1.0 inch. A suitable length L in this example is approximately 6.5 inches when the length L1 of the termination is not greater than 4 inches. Further, a radius R of the corner extremity 38 is preferably not less than approximately 25 percent of the width W for promoting the drainage of any retained liquids following use of the device 10.

Preferably the sheet member 12 is substantially transparent for permitting visual recognition of the conduit termination 20, and for observing liquids or other contamination that may have collected within the cavity 15. In many applications, a suitable material for the sheet member is polyethylene. This material may have an effective small amount of UV inhibitor as an additive for prolonging the useful life of the device 10 when used in direct sunlight. A suitable thickness of the material in the above example is approximately 0.005 inch, a preferred range being from 0.001 inch to 0.008 inch. When the device 10 is to be used when petroleum chemicals may be present, such as when protecting disconnected hydraulic lines, it is preferred that the thickness be at least 0.003 inch for inhibiting degradation of the effective protection afforded by the sheet member 12. The sleeves 34 can be formed of the same material, being thermally bonded to the sheet member 12 in a conventional manner.

Depending upon the fit, wire cutters may be required to cut the band portion 30 of the tie strap 28 for removal. Advantageously the band portion 30 is located proximate the opening 18 of the body 14, 1 to 4 inches away from fragile conduit ends thereby preventing damage to the conduit ends when cutting the tie strap.

The present invention advantageously provides protection from airborne contaminants as well as from solid or liquid contamination. Also, the invention advantageously avoids harmful oil spillage into the environment. Further, a user is motivated to use the present invention by the ease of installation and universal fit rather than using a cap and/or plug which is likely to require extra time in finding such a device having a proper fit.

Figure 5:
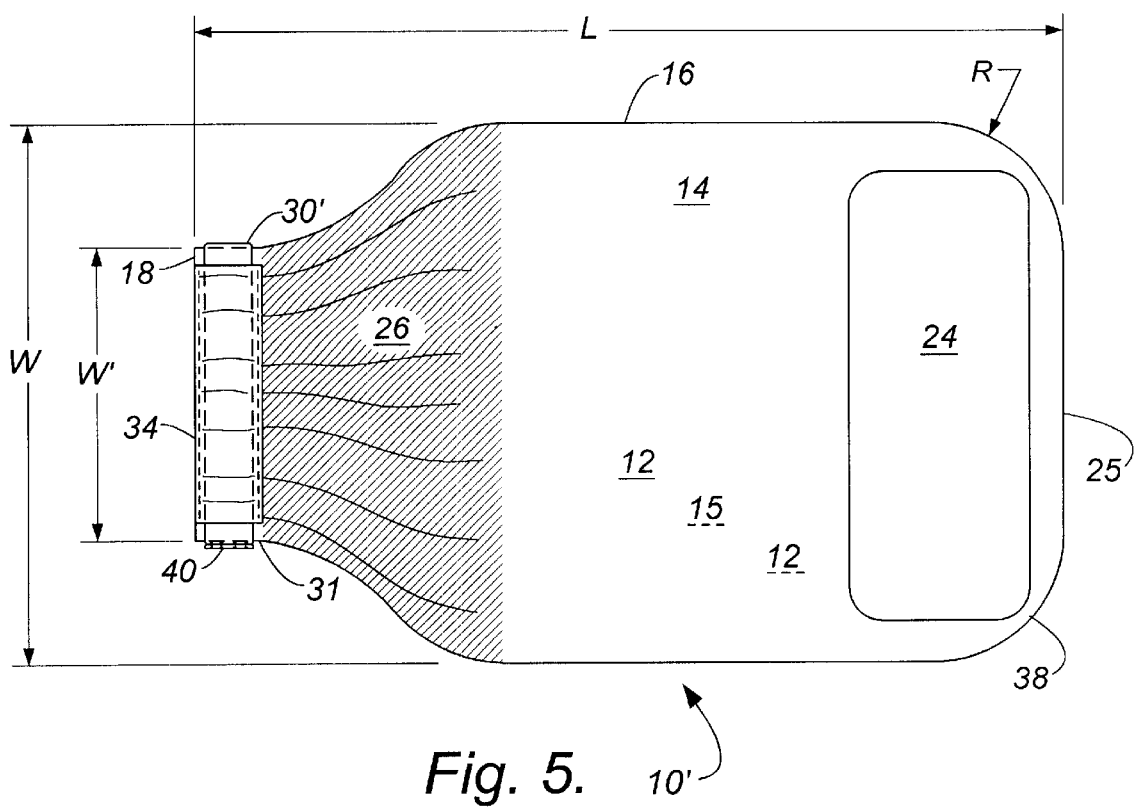
FIG. 5 is a plan view as in FIG. 3, showing another alternative configuration of the protector of FIG. 1.

With further reference to FIG. 5, another alternative configuration of the device, designated 10", has an elastic counterpart of the tie strip band portion, designated elastic band 30' substituted for the tie strap 28. the elastic band 30' has opposite ends overlapping and joined as indicated at 40 by suitable means such as stitching or thermal bonding. The band 30' has a relaxed circumference that is less than that of the body 14 to effect a reduced width W' of the neck portion 31 being less than the width W of the body in the flattened condition thereof as shown in FIG. 5, the band 30' having sufficient elasticity to permit the neck portion 31 to be passed over the conduit termination and seated on the conduit 22 as described above in connection with FIGS. 2 and 4. Preferably the band 30' is stretched nearly to the limit of its elasticity when the neck portion 31 is expanded fully, thereby producing sealed contact between the neck portion 31 and the conduit 22 when the conduit 22 has a circumference that is significantly smaller than a maximum circumference of the termination 20. Thus the band member 30 has a relaxed condition, a stretched condition that permits the conduit termination 20 to be inserted into the cavity 15, and an intermediate condition wherein the neck portion biasingly grips the conduit 22. Preferably the width W' is sufficiently small that the band 30' remains under tension when the neck portion 31 is seated on the conduit 22. Accordingly, the width W' be not more than approximately half of the width W, being preferably not more than 30 percent of the width W.

Although the present invention has been described in considerable detail with reference to certain preferred versions thereof, other versions are possible. For example, a locally applied adhesive can be used in place of the loop enlargement 36 of FIGS. 1 and 2 (or the enlargement 36' of FIGS. 3 and 4) for retaining the tie strap 28 assembled on the body 14 prior to use of the device 10. Further, in the configuration of FIGS. 3 and 4 the band portion 30 is doubled over (and may be creased somewhat) in the flattened condition of the body 14, thereby tending to retain the tie strap 28 assembled with the strap 30 threaded through the sleeve members 34. The device 10 can also be formed from a flexible polymer member with an elastic and/or rubber band formed into the bag in place of the strap 28. The body 14 can also be elastic in the area of the opening 18. Therefore, the spirit and scope of the appended claims should not necessarily be limited to the description of the preferred versions contained herein.

What is claimed is:

1. A protective device for a conduit termination, the termination being attached at an extremity of a conduit, the device comprising:
    (a) a flexible sheet member forming a body having a fluid-tight cavity therein, the body having a neck portion forming a singular opening of the cavity for receiving the conduit termination;
    (b) a tie strap comprising a band member supported relative to the body and having a buckle for adjustably holding a portion of the band member for securing the band member about the neck portion in the form of an adjustable closed loop for sealingly closing the cavity, whereby at least a portion of the conduit termination is sealingly enclosed within the cavity; and
    (c) a sleeve member fixedly formed on the body for receiving a portion of the band member, wherein the buckle forms a first enlargement, the band member also being formed with a second enlargement, the tie strap being retained by the sleeve member being located between the enlargements.

2. The protective device of claim 1, wherein at least a first portion of the sheet member is transparent for visual identification of matter contained therein.

3. The protective device of claim 2, further comprising an opaque coating covering a second portion only of an outer surface of the sheet member and forming a marking surface, the marking surface being adapted for receiving written indicia thereon to form a label for recording usage of the device.

4. The protective device of claim 1, wherein a portion of an outer surface of the sheet member is an identification region being colored for indicating intended use of the device.

5. The protective device of claim 1, wherein a portion of an outer surface of the sheet member forms a marking surface being adapted for receiving written indicia thereon for recording usage of the device.

6. The protective device of claim 1, wherein the sleeve member extends proximate a portion of the opening.

7. The protective device of claim 1, wherein the body has a closed extremity opposite the opening, the closed extremity having a curved contour for avoiding unwanted trapping of liquid within portions of the cavity subsequent to removal of the conduit termination therefrom.

8. A protective device for a conduit termination, the termination being attached at an extremity of a conduit, the device comprising:
    (a) a flexible sheet member forming a body having a fluid-tight cavity therein, the body having a closed extremity and a neck portion forming a singular opening of the cavity for receiving the conduit termination;
    (b) a sleeve member extending proximate a portion of the opening; and
    (c) an elastically stretchable band member extending through the sleeve member and being formed as a closed loop for securing the band member about the neck portion for sealingly closing the cavity, whereby at least a portion of the conduit termination is sealingly enclosed within the cavity, wherein the body is adapted for assuming a flattened condition when the conduit termination is not within the cavity, the body in the flattened condition having a body width, the neck portion having a neck width being not more than 30 percent of the body width in the relaxed condition of the band member.

9. The protective device of claim 8, the body in the flattened condition having a length from the opening to the closed extremity, body width being between opposite side edges of the body, and the body having a rounded contour between the closed extremity and the side edges in the flattened condition for avoiding unwanted trapping of liquid within portions of the cavity subsequent to removal of the conduit termination therefrom.

10. The protective device of claim 8, wherein at least a first portion of the sheet member is transparent for visual identification of matter contained therein, the device further comprising an opaque coating covering a second portion only of an outer surface of the sheet member and forming a marking surface, the marking surface being adapted for receiving written indicia thereon to form a label for recording usage of the device.

11. The protective device of claim 10, wherein the identification region is in a third portion only of the outer surface of the sheet member, the second and third portions together being outside of the first portion.

12. A protective device for a conduit termination, the termination being attached at an extremity of a conduit, the device comprising:
 (a) a flexible sheet member forming a body having a fluid-tight cavity therein, the body having a neck portion forming a singular opening of the cavity for receiving the conduit termination; and
 (b) a band member supported relative to the body and having means formed therein for securing the band member about the neck portion in the form of an adjustable closed loop for sealingly closing the cavity, whereby at least a portion of the conduit termination is sealingly enclosed within the cavity, wherein the body is adapted for assuming a flattened condition when the conduit termination is not within the cavity, the body in the flattened condition having a length from the opening to the closed extremity and a width between opposite side edges thereof, and a rounded contour between the closed extremity and the side edges, and wherein the rounded contour has a radius being not less than 25 percent of the width of the body in the flattened condition thereof.

13. The protective device of claim 12, comprising a tie strap including the band member, the means for securing comprising a buckle for adjustably holding a portion of the band member.

14. The protective device of claim 12, wherein the polymer is polyethylene.

15. The protective device of claim 14, wherein the polymer has a thickness of at least 0.003 inch.

16. The protective device of claim 12, wherein at least a first portion of the sheet member is transparent for visual identification of matter contained therein, the device further comprising an opaque coating covering a second portion only of an outer surface of the sheet member and forming a marking surface, the marking surface being adapted for receiving written indicia thereon to form a label for recording usage of the device.

17. The protective device of claim 16, wherein the identification region is in a third portion only of the outer surface of the sheet member, the second and third portions together being outside of the first portion.

18. The protective device of claim 12, comprising a tie strap including the band member, the means for securing comprising a buckle for adjustably holding a portion of the band member, the buckle forming a first enlargement of the tie strap, the band member having a second enlargement spaced from the buckle, the device further comprising a sleeve member being fixedly formed on the body and extending proximate a portion of the opening, the sleeve member being adapted for hindering passage of the first and second enlargements therethrough for resisting unwanted separation of the tie strap from the body.

19. A protective device for a conduit termination, the termination being attached at an extremity of a conduit, the device comprising:
 (a) a flexible sheet member forming a body having a fluid-tight cavity therein, the body having a neck portion forming a singular opening of the cavity for receiving the conduit termination; and
 (b) a band member supported relative to the body and having means formed therein for securing the band member about the neck portion in the form of an adjustable closed loop for sealingly closing the cavity, whereby at least a portion of the conduit termination is sealingly enclosed within the cavity, wherein the body is adapted for assuming a flattened condition when the conduit termination is not within the cavity, the body in the flattened condition having a length from the opening to the closed extremity and a width between opposite side edges thereof, and a rounded contour between the closed extremity and the side edges, and wherein the width of the body in the flattened condition thereof is between 1 inch and 6 inches, the sheet member being formed of a polymer having a thickness of between 0.002 inch and 0.008 inch.

20. The protective device of claim 19, wherein at least a first portion of the sheet member is transparent for visual identification of matter contained therein, the device further comprising an opaque coating covering a second portion only of an outer surface of the sheet member and forming a marking surface, the marking surface being adapted for receiving written indicia thereon to form a label for recording usage of the device.

21. The protective device of claim 20, wherein the identification region is in a third portion only of the outer surface of the sheet member, the second and third portions together being outside of the first portion.

22. The protective device of claim 19, comprising a tie strap including the band member, the means for securing comprising a buckle for adjustably holding a portion of the band member, the buckle forming a first enlargement of the tie strap, the band member having a second enlargement spaced from the buckle, the device further comprising a sleeve member being fixedly formed on the body and extending proximate a portion of the opening, the sleeve member being adapted for hindering passage of the first and second enlargements therethrough for resisting unwanted separation of the tie strap from the body.

23. The protective device of claim 19, wherein the polymer is polyethylene having a thickness of at least 0.003 inch.

* * * * *